(12) United States Patent  
Kito

(10) Patent No.: US 7,084,954 B2  
(45) Date of Patent: Aug. 1, 2006

(54) PRINTER, PRINT-ORDER RECEIVING APPARATUS, AND DISPLAYING METHOD FOR A FRAME-INDEX PICTURE

(75) Inventor: Eiichi Kito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 175 days.

(21) Appl. No.: 10/807,320

(22) Filed: Mar. 24, 2004

(65) Prior Publication Data

US 2004/0189959 A1 Sep. 30, 2004

(30) Foreign Application Priority Data

Mar. 25, 2003 (JP) .............................. 2003-083448

(51) Int. Cl.
*G03B 27/32* (2006.01)
*G03B 27/52* (2006.01)

(52) U.S. Cl. ........................................ 355/40; 355/77

(58) Field of Classification Search ................. 355/40, 355/77; 348/207.2, 207.11, 231.2; 358/1.9; 715/854; 382/305
See application file for complete search history.

(56) References Cited

U.S. PATENT DOCUMENTS

| | | | |
|---|---|---|---|
| 6,453,078 B1* | 9/2002 | Bubie et al. | 382/305 |
| 6,552,743 B1* | 4/2003 | Rissman | 348/207.2 |
| 6,784,925 B1* | 8/2004 | Tomat et al. | 348/207.11 |
| 6,883,146 B1* | 4/2005 | Prabhu et al. | 715/854 |
| 6,956,671 B1* | 10/2005 | Monty et al. | 358/1.9 |
| 2003/0035054 A1* | 2/2003 | Ohmura | 348/231.2 |

FOREIGN PATENT DOCUMENTS

JP 11-321029 A 11/1999
JP 2000-326565 A 11/2000

* cited by examiner

*Primary Examiner*—Rodney Fuller
(74) *Attorney, Agent, or Firm*—Sughrue Mion, PLLC

(57) ABSTRACT

A memory card is set into a slot of a printer. The printer distinguishes whether or not frames of the memory card are recorded in a grouping format. When the frames are recorded in the grouping format, a main-index picture merely including representative frames of the grouped frames is displayed. Selection of the representative frame changes the picture to a sub-index picture for displaying an index of the frames included in the group concerned. In comparison with a case in that all the frames are displayed on the sole index picture, classification of the frames is easily grasped. Further, the frames may be confirmed every group so that it is easy to search the frame.

18 Claims, 9 Drawing Sheets

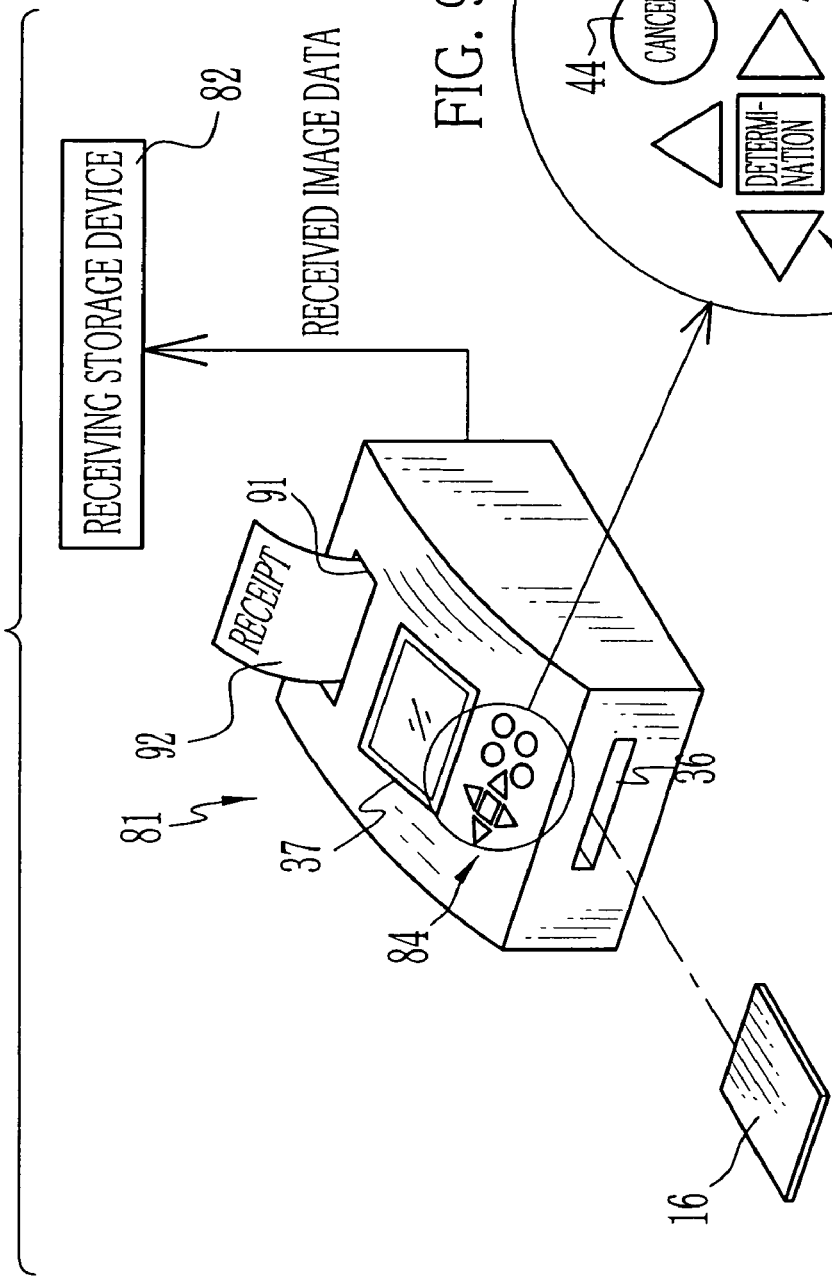
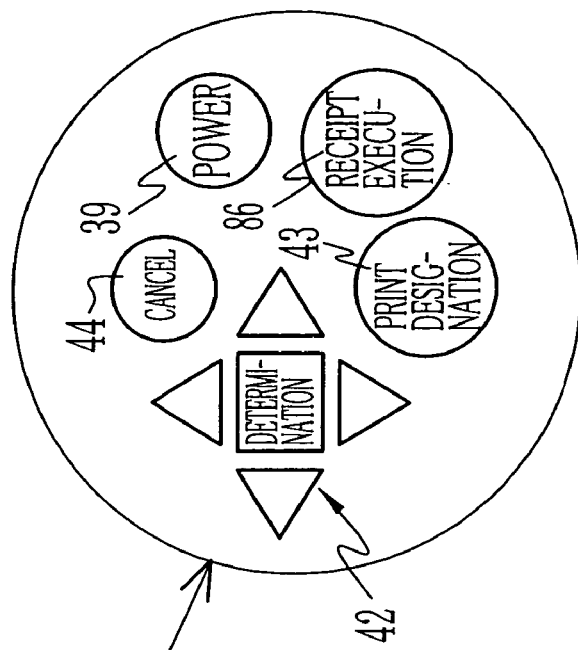
FIG. 9A
FIG. 9B

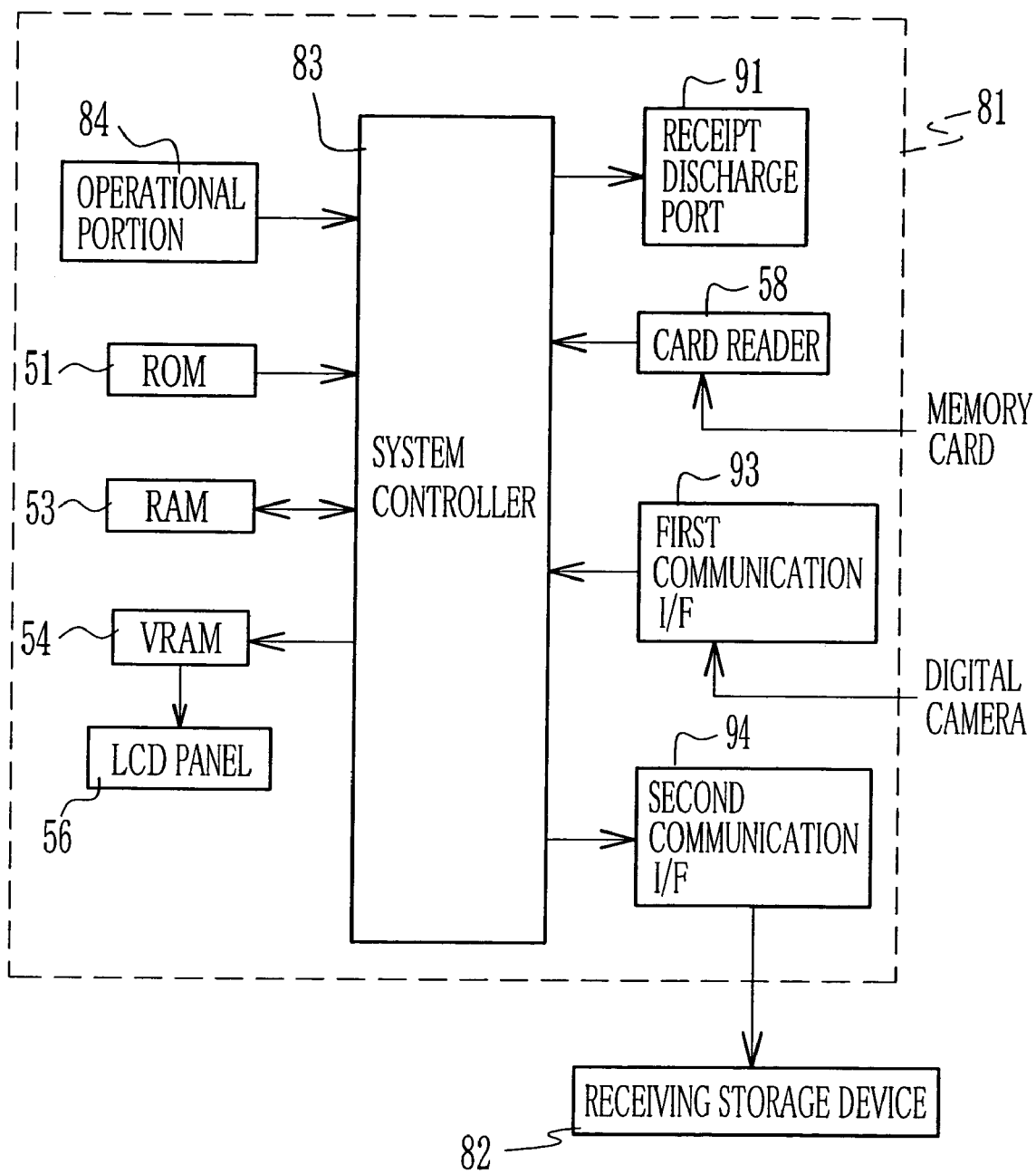

US 7,084,954 B2

PRINTER, PRINT-ORDER RECEIVING APPARATUS, AND DISPLAYING METHOD FOR A FRAME-INDEX PICTURE

BACKGROUND OF THE INVENTION

1. Field of the Invention

The present invention relates to a printer for printing a frame picture recorded in a recording medium. Further, the present invention relates to a print-order receiving apparatus for receiving a print order of a frame recorded in a recording medium.

2. Description of the Related Art

There is a direct printing method, which is on the road to popularization. In the direct printing method, image data recorded in a memory card by using a digital camera is directly inputted into a printer without passing through a personal computer. With respect to the printer, which is adaptable to the direct printing method, a printer body thereof is provided with a card reader and a communication interface as an image-data receiving unit (see Japanese Patent Laid-Open Publication Nos. 11-321029 and 2000-326565, for instance). The card reader reads the memory card. The communication interface is connected to the card reader itself and the digital camera to transfer the data.

A print operation of this kind of the direct printing method is performed by using an operation member and a display equipped on the digital camera and the printer. Basically, after loading a memory card into a card slot, a frame to be printed is designated, and then, execution of printing is instructed. In this way, an operational procedure is extremely simplified in comparison with a case in that a personal computer is used. For example, a designating operation of the frame to be printed is performed, watching an index picture of frames shown on the display. A cursor for selecting the frame is moved with a key arranged in a crisscross form, in order to select a desired frame to be designated as the print frame. In virtue of popularization of such a printer, anyone can easily enjoy printing the image, which is recorded by using the digital camera, without complicated operation.

By the way, in recent years, a memory card having high capacity is rapidly developed. It is supposed that a memory card having capacity of GB (Giga-Byte) will be generalized in the near future. In accordance with this, it becomes possible to record images of a few thousands frames in a single memory card. From among a large number of the frames recorded in such a high-capacity memory card, a specific frame is sought and is designated as the print frame. This designating operation is supposed to be troublesome, since there are so many frames. In particular, when printing is performed by the forgoing direct printing method, it is considered that the above problem is much remarkable in comparison with a case in that the personal computer is used.

When an index picture of the frames is shown on the display, it is impossible to display too many frames in one picture on condition that the respective frames are displayed so as to have an observable size. Thus, it is required that scrolling the index picture is frequently repeated in order to seek the desired frame from among a large number of the frames. Such operation may be carried out in a comparatively easy way with a personal computer, which has a mouse and a multipurpose keyboard as operational members. This is because it is possible to perform scrolling with the mouth, and it is possible to select the plural frames in block by using both of the mouth and the keyboard.

In the direct printing method, however, operational members of the printer and the digital camera must be used to carry out the operation. The operational members of the printer and the digital camera have an extremely simple structure in comparison with the mouse and the multipurpose keyboard so that operability for scrolling the picture and for selecting the frame is inferior to the personal computer. Meanwhile, the display provided on the printer and the digital camera is generally small. A picture size of the display is a few inches. When the picture size is small, visibility of the frames deteriorates. In addition, a number of the frames to be displayed within one picture decreases so that a number of the scrolling operations increases. Consequently, troublesome is further caused.

SUMMARY OF THE INVENTION

In view of the foregoing, it is a primary object of the present invention to provide a printer in which a desired frame to be designated as a print frame is sought from among a large number of frames by a simple operation.

It is a second object of the present invention to provide a print-order receiving apparatus in which a desired frame to be designated as a print frame is sought from among a large number of frames by a simple operation.

In order to achieve the above and other objects, the printer according to the present invention distinguishes whether or not frames of a recording medium are recorded in a grouping format. The frames are grouped on the basis of the grouping format. The printer distinguishes the grouping format or not when transferring image data of the frames to the printer. An index picture of the transferred frames is shown on a display member. The printer has a frame selector for selecting the frame from the index picture, and also has a frame designator for designating the selected frame as a print frame. The printer prints the designated print frame on a recording paper. When the frames are recorded in the grouping format, the index picture is produced so as to merely include representative frames of the grouped frames. Upon selecting the representative frame, the index picture is changed to a sub-index picture for displaying an index of the frames included in the group concerned.

The print-order receiving apparatus of the present invention distinguishes whether or not the frames of the recording medium are recorded in the grouping format. The print-order receiving apparatus distinguishes the grouping format or not when transferring the image data of the frames to the print-order receiving apparatus. An index picture of the transferred frames is shown on a display member. The print-order receiving apparatus has a frame selector for selecting the frame from the index picture, and also has a frame designator for designating the selected frame as a print frame. The print-order receiving apparatus receives a print order of the designated print frame. When the frames are recorded in the grouping format, the index picture is produced so as to merely include representative frames of the grouped frames. Upon selecting the representative frame, the index picture is changed to a sub-index picture for displaying an index of the frames included in the group concerned.

A frame-index displaying method of the present invention comprises a step of distinguishing whether or not the frames of the recording medium are recorded in the grouping format. The frame-index displaying method also comprises a step of transferring the image data of the frames, and further comprises a step of displaying an index picture for selecting the frame. When the frames are recorded in the grouping format, the produced index picture merely includes the representative frames of the grouped frames. Upon selecting the representative frame, the index picture is changed to a sub-index picture for displaying an index of the frames included in the group concerned.

According to the present invention, it is possible to easily carry out an operation for seeking the desired frame to be designated as the print frame, from among a large number of the frames.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 9A is a perspective view showing a print-order receiving apparatus;

FIG. 9B is an enlarged view showing an operational portion of the print-order receiving apparatus; and FIG. 10 is a block diagram schematically showing an electric structure of the print-order receiving apparatus.

DETAILED DESCRIPTION OF THE PREFERRED EMBODIMENT(S)

Figure 1A:
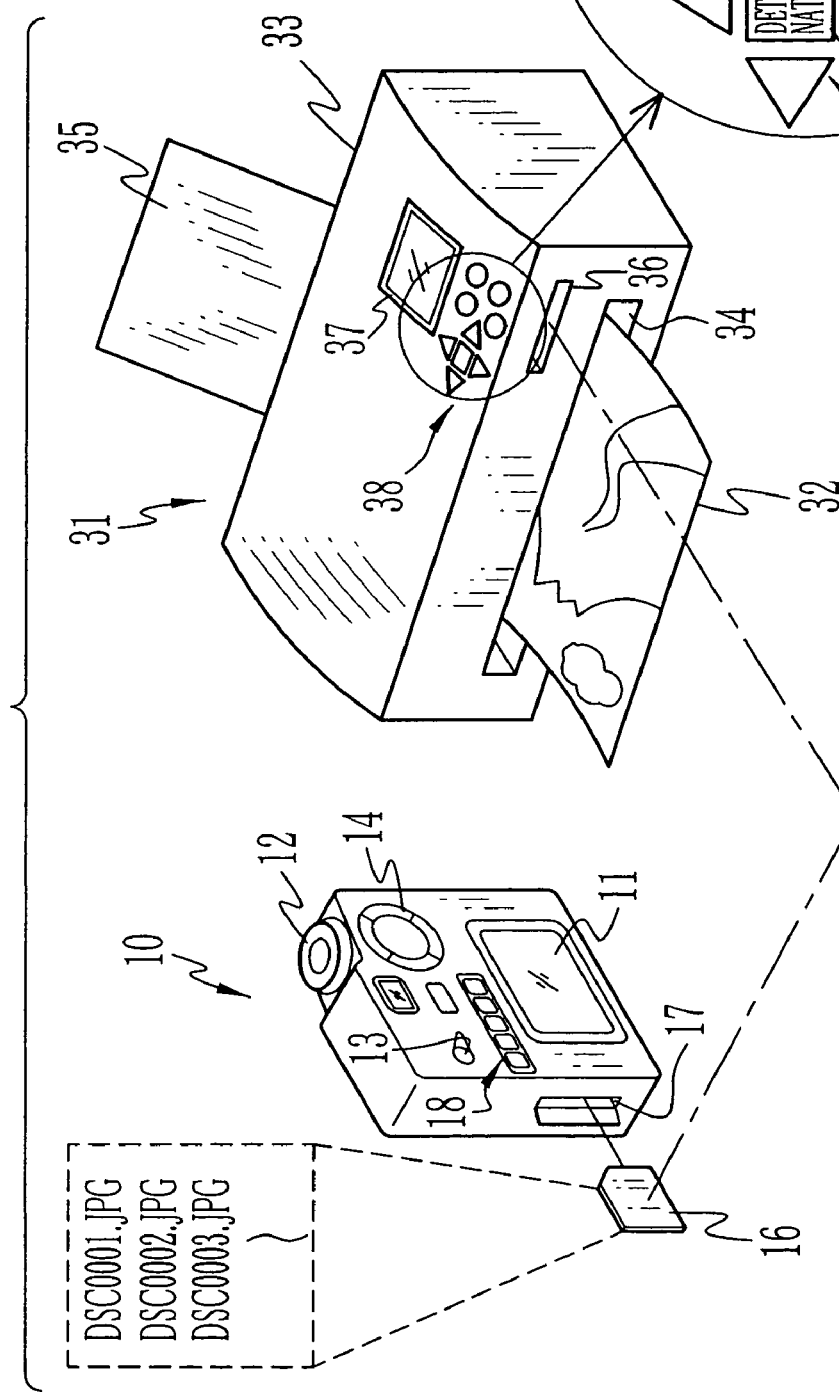
FIG. 1A is a perspective view showing a printer.
Figure 1B:
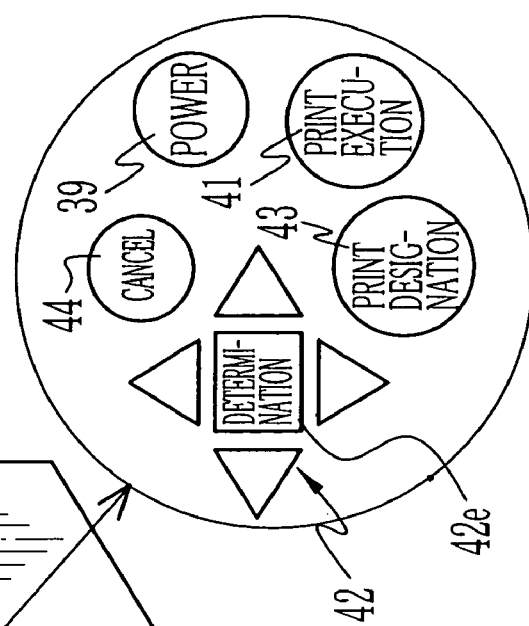
FIG. 1B is an enlarged view showing an operational portion of the printer.

A digital camera 10 shown in FIG. 1 is provided with a taking lens disposed at a front side of a main body, and an LCD panel 11 disposed at a rear side thereof. An operational section includes a shutter button 12, a mode-selecting lever 13, a multipurpose key 14 and so forth. The mode-selecting lever 13 is for changing operation modes of a photographic mode, a reproduction mode and so forth. The multipurpose key 14 has depression portions arranged in crisscross directions, and different functions are assigned thereto in accordance with the operation modes.

Photographed image data is recorded in a memory card 16, which is removably loaded into a slot 17 formed at a lateral side of the main body. As to the memory card 16, there are various kinds, for instance, of SmartMedia (trade name), xD Picture Card (trade name), CompactFlash (registered trademark), a memory card of PC-card type, and so forth. Any of them may be used. Besides the memory card, it is possible to use recording media of MicroDrive (trade name) and so forth.

A basic method for storing the photographic image data in the memory card 16 is defined by Exif standard and DCF (Design rule for Camera File system) standard prescribed by JEITA (Japan Electronics and Information Technology Industries Association). An image file format and so forth are also defined by the Exif standard and the DCF standard. An image folder is made in the memory card 16 according to specifications of the DCF standard. The photographed image data is stored in the image folder as an image file of a predetermined file form (for example JPEG form) according to specifications of the Exif standard.

The image file of the Exif form is constituted of the image data and additional information. The image data comprises pixel data, and the additional information includes photographic conditions, a photographic date, a type name of a camera, and so forth. The additional information is stored in an area called as ExifTag, which is defined by the Exif standard. Besides the above information, the ExifTag keeps a MakerNote area in which a manufacturer can save optional information. The image data includes not only main-image data to be used for printing but also thumbnail-image data whose pixel number is smaller than that of the main-image data. The thumbnail-image data is used as preview image data.

The digital camera 10 possesses a grouping function for grouping frame images to be recorded in the memory card 16. The grouped frame image is recorded in the memory card 16 according to a format for grouping (hereinafter called as grouping format), which is described later. By utilizing the grouping function, it is possible to classify the frame images of the memory card 16 with respect to each of photographic scenes of "Sports" and "School Play", for instance. When the images of frames are grouped in this way, it is possible to deal with the frames every group. Concretely, the frames grouped as a lump are transferred all together from the digital camera 10 to an external device of a printer, a personal computer and so forth.

Grouping is executed by operating a grouping button 18 including a start button, a group-editing button and so forth. The start button turns on and off a mode for grouping (hereinafter called as grouping mode). The group-editing button executes a division and a connection of the produced group. For example, upon depression of the start button, the digital camera 10 is set under the grouping mode, and one of grouping sessions is started. Frames photographed in this session are recorded so as to belong to the same group. When the start button is depressed once more to turn off the grouping mode, one session is over at that time. If it is desired to produce another group, the grouping mode is turned on again to start another session, and then, photographing is performed. By repeating this operation, the frames to be photographed are grouped. Further, by operating the group-editing button, a divisional position of the group and the groups to be united are designated to reedit the groups.

Figure 2:
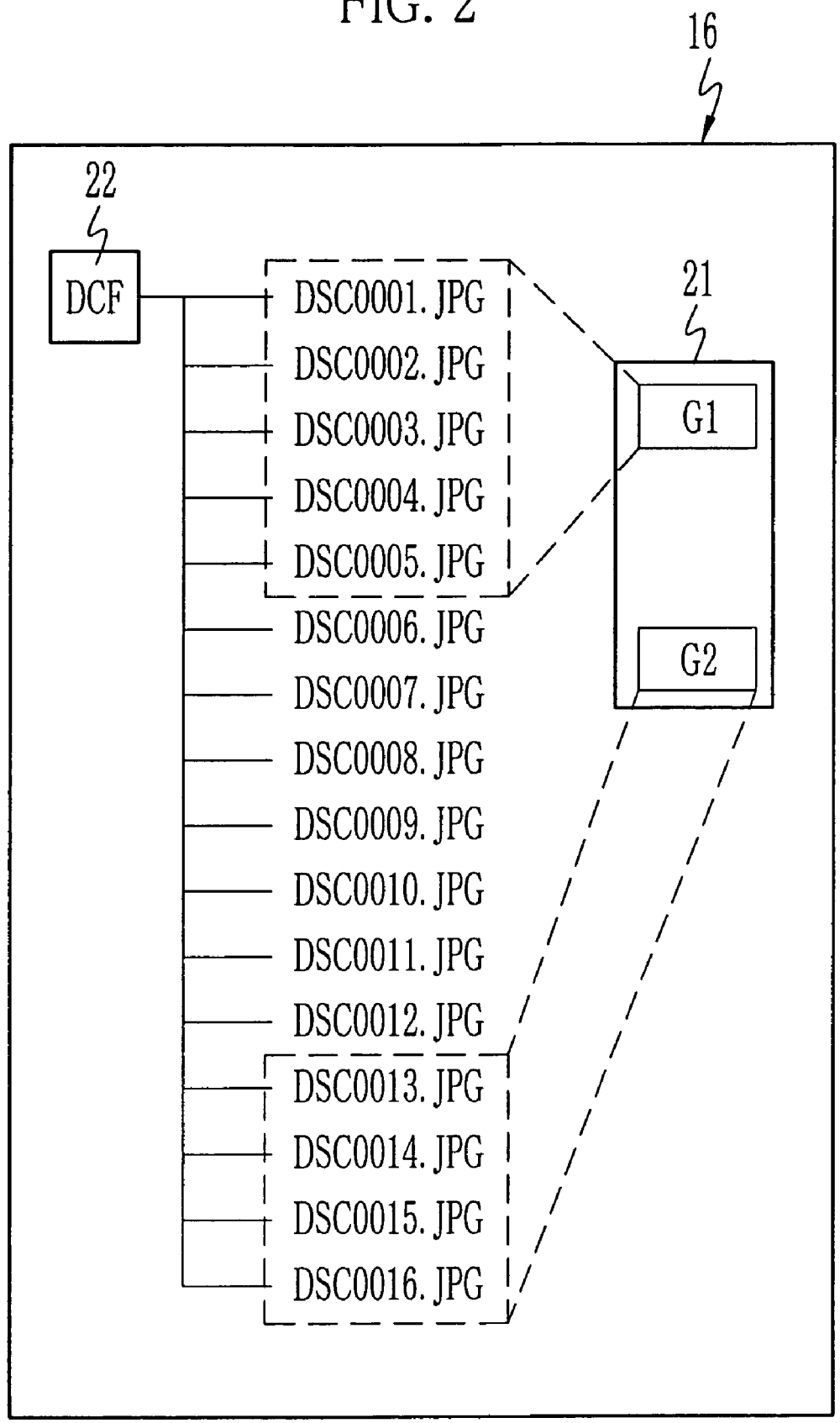
FIG. 2 is an explanatory illustration showing a first example of a grouping format.

FIG. 2 shows an example of the grouping format wherein a grouping-information file 21 for storing composition information of the image groups is produced separately from the respective image files having file names of DSC0001-n.JPG. The grouping-information file 21 is recorded in the memory card 16 together with the respective image files. A folder 22 is an image-file storing folder produced according to the DCF standard.

The composition information of the image groups represents, for example, that five frames of DSC0001.JPG to DSC0005.JPG constitute the image group G1, and four frames of DSC0013.JPG to DSC0016.JPG constitute the image group G2. It is needless to say that all the frames of the memory card 16 are not required to belong to any image group. Such as the respective image files of DSC0006.JPG to DSC0012.JPG, non-grouped frames being independent from the image group may exist at the same time.

A title of a photographic scene, for example "Sports" and "School Play", and a photographic date may be recorded as additional information regarding the produced group. The additional information is stored in the respective image files or in the grouping-information file 21.

The grouping format is not defined by the forgoing DCF standard. The image file, however, is stored in the folder produced according to the DCF standard so that a basic storage form of the DCF standard is maintained. Therefore, even if the memory card, which records the frames in the grouping format by using the digital camera 10 of this embodiment, is used in another digital camera, which is not adapted to the grouping format, it is prevented to cause a problem concerning compatibility. For example, it is prevented to cause a problem in that reading the image file is impossible.

A printer 31 reads the image data from the memory card 16. On the basis of the read image data, the printer 31 prints an image on a recording paper 32. As a printing method, is adopted an ink-jet method in which an ink is jetted to a recording surface to form a print image. The printer 31 has a function for distinguishing the grouping format. When the frame of the memory card 16 is recorded in the grouping format, the printer 31 displays an index picture corresponding thereto. Distinguishing the grouping format is conducted by referring to the grouping-information file 21.

A rear side of a main body 33 of the printer 31 is provided with a paper guide 35 for guiding the recording paper 32 to a paper inlet (not shown). The supplied recording paper is discharged from a paper outlet 34 formed at a front side of the main body 33, after performing a printing process in the main body 33.

A card slot 36 to be loaded with the memory card 16 is formed above the paper outlet 34. Behind the card slot 36, is disposed a card reader (see reference numeral 58 in FIG. 5) for reading the image file from the memory card 16. A sensor (not shown) for detecting the load of the memory card 16 is disposed inside the card slot 36. When the load of the memory card 16 is detected by this sensor, access to the memory card 16 is automatically started by the card reader 58. Of course, the access may not be automatically started when the memory card 16 has been automatically detected by the sensor. In this case, the access is started by an operation signal of a reading start button and so forth.

At the time of the access, the printer 31 executes a format check to examine whether or not the frames of the memory card 16 are recorded in the grouping format. After the format check, thumbnail-image data for producing an index is transferred. With respect to the grouped frames in the case of the grouping format, the thumbnail-image data of the representative frames thereof are merely read out. With respect to the non-grouped frames in this case, all of them are read out. Meanwhile, when the frames are not recorded in the grouping format, the thumbnail-image data of all the frames included in the memory card 16 are read out.

An upper side of the main body 33 is provided with a display panel 37 and an operational portion 38. The display panel 37 previews the respective frames one by one, and also shows an index picture in which preview images of the frames are arranged. Further, the display panel 37 shows various setting pictures. An LCD is used as the display panel and a picture size thereof is a few inches. The operational portion 38 comprises a power-supply button 39, a print button 41, a crisscross arrangement key 42, a print-frame designation button 43, and a chancel button 44. The crisscross arrangement key 42 includes four directional keys arranged in cross directions. The crisscross arrangement key 42 further includes a determination key arranged at the center of the directional keys. Frame selection is conducted by using the crisscross arrangement key 42. The print-frame designation key 43 designates the selected frame as a print frame. The printing process of the designated frame is executed by operating the print button 41. The chancel button 44 chancels an operation to return to the previous state.

Figure 3:
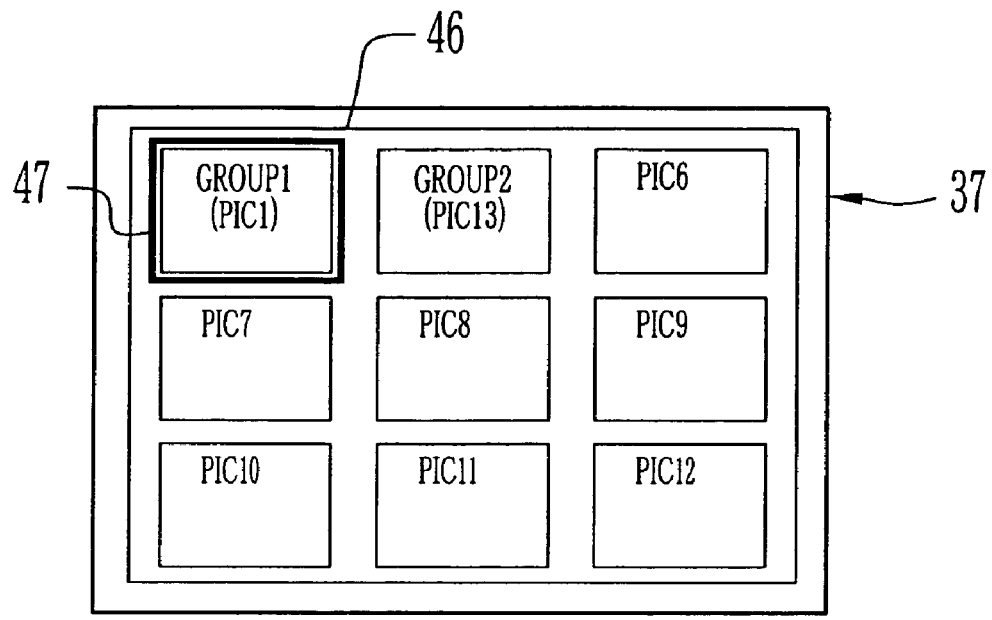
FIG. 3 is an explanatory illustration showing a main-index picture.

After transferring the thumbnail-image data by means of the card reader 58, a main-index picture 46 is produced on the basis of the transferred data. This index picture 46 is shown on the display panel 37, such as shown in FIG. 3. A number of the frames to be shown on the display panel 37 at once is nine of three times three in total, for instance. Within the main-index picture 46, a cursor 47 for selecting any frame is indicated. The cursor 47 is movable in all directions by operating the directional keys of the crisscross arrangement key 42. Upon moving the cursor 47 in a vertical direction, the picture scrolls to show the other frames in turn besides the nine frames shown at first. When the determination key 42e is depressed in a state that the cursor 47 is positioned, the frame selection is completed.

Regarding the non-grouped frames (frame images PIC6 to PIC 12), each frame is displayed as a preview within the main-index picture 46. Regarding the grouped frames, however, the representative frames of the respective groups are merely displayed. For example, in a case that the frame images PIC1 to PIC5 constitute the image group G1 and the frame images PIC13 to PIC16 constitute the group G2, all the frames belonging to the image groups G1 and G2 are not displayed, but the leading frames of the respective groups G1 and G2 (the frame image PIC1 of the image group G1 and the frame image PIC13 of the image group G2) are previewed as the representative frames of the image groups G1 and G2.

The representative frame is displayed together with an identification indicia for notifying a user about the representative frame of the group. As the identification indicia, group names of GROUP1, GROUP2 or the like are used, for instance. Since the representative frame is displayed, the user can easily recognize the photographic scene ("Sports", "School Play" and so forth) of the group by viewing the picture. If a photographic date and a title of the photographic scene, which are inputted by using the digital camera 10, are displayed as the group name and additional information thereof, it is more lucid and convenient.

Incidentally, in this embodiment, the leading frame of the group (the frame having the smallest frame number) is used as the representative frame. However, the last frame may be used. Further, the representative frame may be changed by setting.

Figure 4:
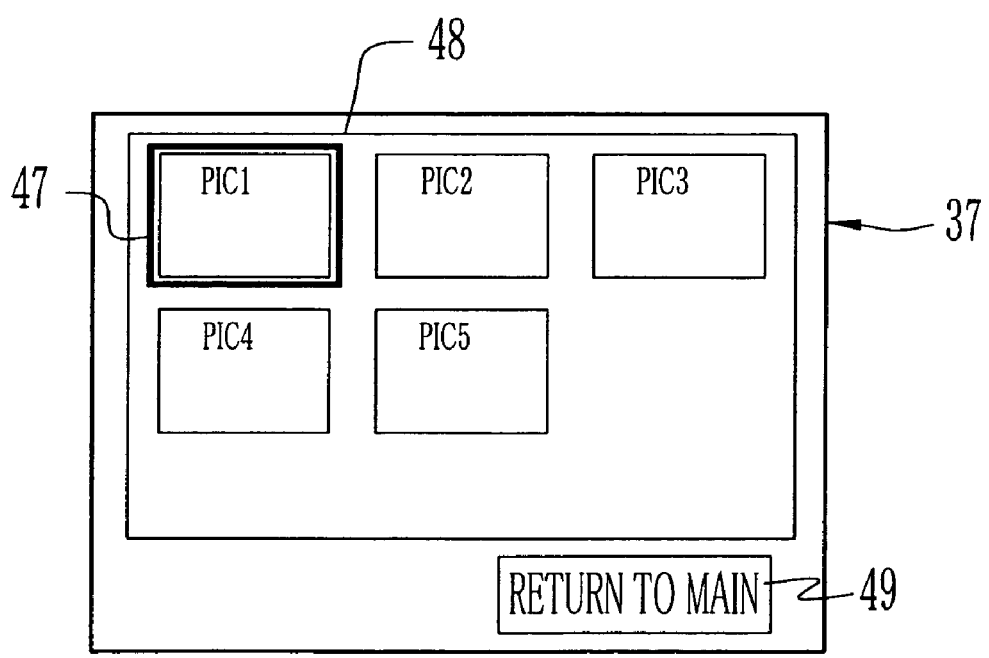
FIG. 4 is an explanatory illustration showing a sub-index picture.

When the cursor 47 is positioned on the non-grouped frame and the determination key 42e is depressed to select this frame from the main-index picture 46, the selected frame is enlarged and displayed. Successively, upon depressing the print-frame designation button 43 in the selected state, the current frame is designated as the print frame. Meanwhile, when the cursor 47 is positioned on the representative frame and the determination key 42e is depressed to select it, a sub-index picture 48 is produced to display an index of the frames included in the group concerned, such as shown in FIG. 4. In other words, the picture of the display panel 37 is changed from the main-index picture 46 to the sub-index picture 48.

The sub-index picture 48 displays the grouped frames belonging to the group of the selected representative frame. FIG. 4 shows the index picture of the image group G1. The sub-index picture 48 is displayed together with the cursor 47 similarly to the main-index picture 46. By the cursor 47, the grouped frame is enlarged and displayed. Further, the print frame of the grouped frame is designated by the cursor 47. The sub-index picture 48 accompanies a return button 49. Upon selecting the return button 49, the main-index picture 46 is displayed again.

In this way, the representative frames are merely displayed with respect to the grouped frames. Upon selecting the representative frame, the picture is changed to the sub-index picture for displaying the index of the frames included in the group concerned. By comparison with a case in that all the frames of the memory card 16 are arranged in the sole index picture, a number of the frames included in one picture becomes small so that a scroll amount of the picture is vastly reduced when confirming the frames from the top of the picture to the last thereof. As the scroll amount is reduced, an operational amount of the scroll is reduced in accordance therewith. Thus, the operation for searching the desired frame is lightened. There is an especial advantage when operability and visibility are inferior, for example, when a size of the display panel 37 is small and there are no operational members of a mouse and a keyboard.

The sub-index picture 48 is produced on the basis of the thumbnail-image data of the frames included in the group concerned. Transfer of the thumbnail-image data is started when the determination key 42e has been depressed. As described above, when displaying the main-index picture 46, only the representative frames are read with respect to the grouped frames. The data of the frames included in the group are transferred when the picture is changed to the sub-index picture 48. In virtue of this, it is unnecessary to transfer the redundant data when the main-index picture 46 is displayed. Thus, a display speed becomes faster.

When the print frame is designated on the main-index picture 46 in a state that the representative frame is selected, the frames included in the group of the representative frame are designated as the print frames in a lump.

Upon depressing the print button 41 after designating the print frames, the main-image data of the designated frames are transferred in turn from the memory card 16 to execute the printing process.

Figure 5:
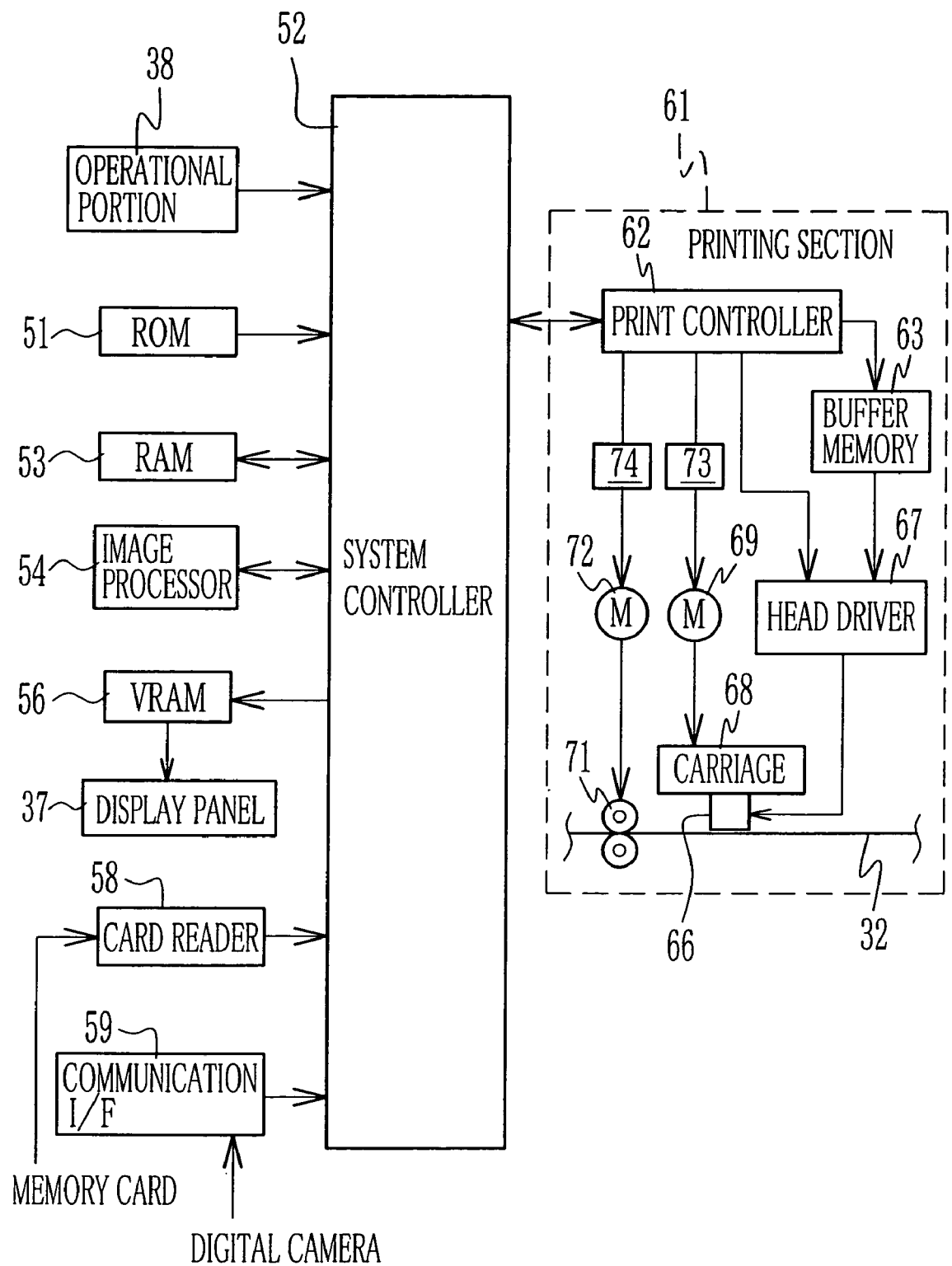
FIG. 5 is a block diagram schematically showing an electric structure of the printer.

FIG. 5 is a block diagram schematically showing an electrical structure of the printer 31. A ROM 51 stores a control program. A system controller 52 integrally controls each section of the printer 31 by executing the control program in accordance with an operation signal outputted from the operational portion 38. A RAM 53 is used as a working memory when the system controller 52 executes the control program. At the same time, the RAM 53 temporarily stores the image data transferred into the printer.

An image processor 54 carries out various image processes for the image data transferred from the memory card 16. The image processor 54 carries out an image correcting process for the thumbnail-image data. On the basis of this data, the index pictures (the main-index picture 46 and the sub-index picture 48) are produced. The index pictures are outputted to a VRAM 56 and are shown on the display panel 37. Further, the image processor 54 carries out the image correcting process for the main-image data.

In response to an instruction sent from the operational portion 38, the system controller 52 instructs the image processor 54 to produce the index picture. Further, the system controller 52 changes the picture shown on the display panel 37.

The card reader 58 accesses the memory card 16 to read out the data. A communication interface 59 is an image-data transferring member connected to the digital camera 10 and for transferring the data. By using the communication interface 59, it is possible to transfer the image data in a state that the camera body is loaded with the memory card 16. The communication interface 59 detects a connection when connected to the digital camera 10. A detection signal of the connection is sent to the system controller 52. In response to the detection signal, the system controller 52 starts a process for transferring the image data from the memory card 16 of the digital camera 10. As to the communication interface 59, an interface of USB standard is used, for example. However, the other interface of IEEE1394 standard and so forth may be used.

A printing section 61 converts the main-image data of red, green and blue, which are inputted from the image processor 54, into print data of Y(yellow), M(magenta), C(cyan) and B(black). On the basis of the print data, the printing process is executed. A print controller 62 controls each section of the printing section 61 on the basis of the print data inputted from the image processor 54. A buffer memory 63 is for temporarily storing the print data. Regarding the print data, a storage area is provided for each of the colors of Y, M, C and B, for example.

A print head 66 has a head body provided with a nozzle for jetting an ink of each color to the recording paper 32. An ink tank containing the ink is set to the head body in an exchangeable manner. A head driver 67 drives the print head 66 on the basis of the print data. The print head 66 is attached to a carriage 68, which is movable in a width direction (scanning direction) of the recording paper 32. The carriage 68 is driven by a carriage motor 69. The print head 66 is reciprocated in the scanning direction to perform line recording. A feeding roller 71 feeds the recording paper 32 stepwise in a feeding direction in synchronism with the line recording performed by the print head 66. The feeding roller 71 is driven by a feeding motor 72. Reference numerals 73 and 74 denote motor drivers for driving the carriage motor 69 and the feeding motor 70 respectively.

Figure 6:
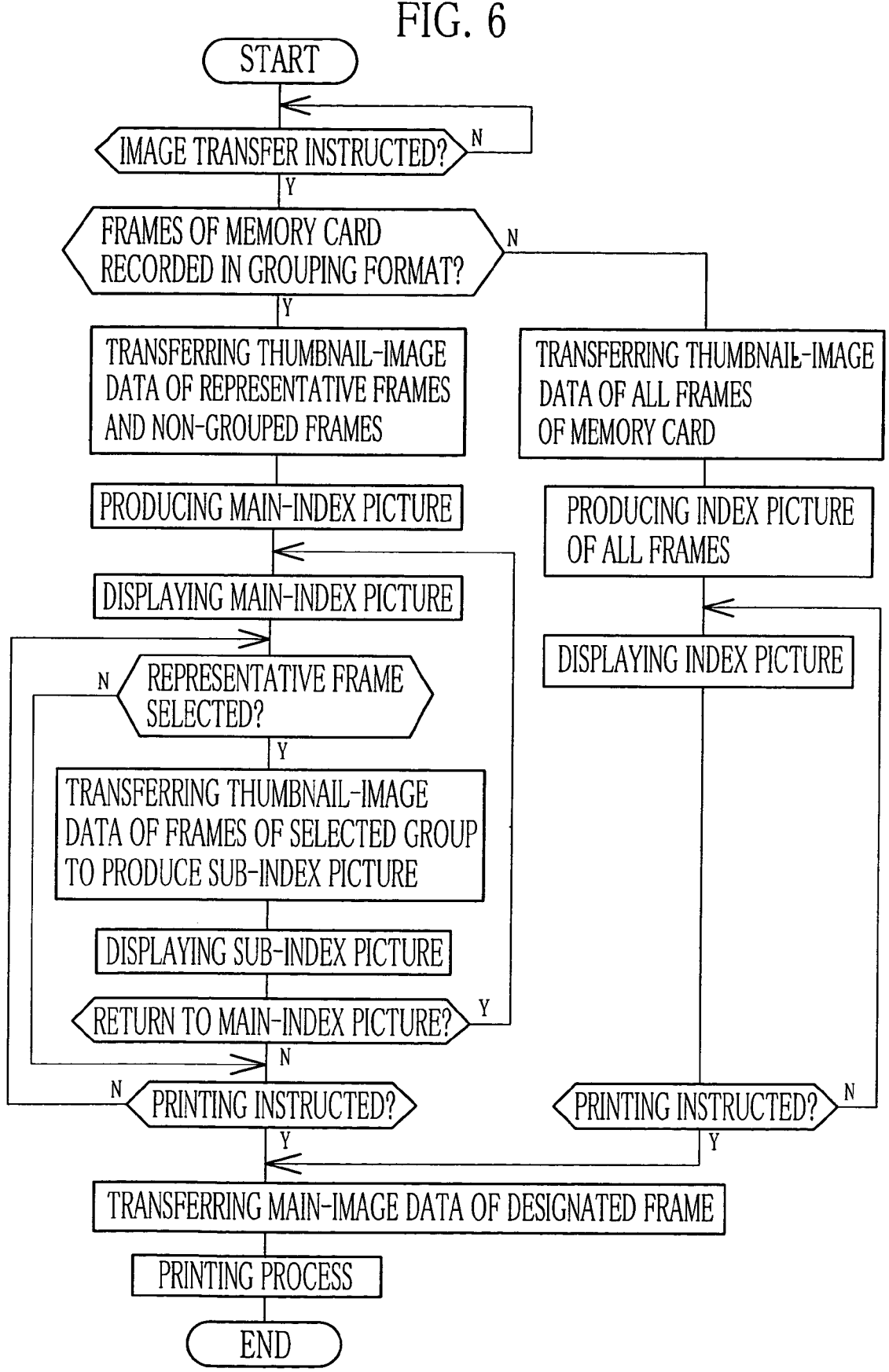
FIG. 6 is a flowchart showing an operational procedure for designating a print frame.

An operation of the above structure is described below, referring to a flowchart shown in FIG. 6. Upon loading the memory card 16 into the card reader 58 or upon connecting the digital camera 10 to the communication interface 59, the system controller 52 starts the image-data transferring process. At this time, the system controller 52 judges whether or not the frames of the memory card 16 are recorded in the grouping format. In case the frames are not recorded in the grouping format, the thumbnail-image data of all the frames of the memory card 16 are transferred. On the basis of the thumbnail-image data, the index picture of all the frames is produced and shown on the display panel 37.

Meanwhile, when it has been judged that the frames are recorded in the grouping format, the printer 31 reads the thumbnail-image data of all the non-grouped frames. At the same time, the printer 31 reads the thumbnail-image data of only the representative frames with respect to the grouped frames. On the basis of the thumbnail-image data, the main-index picture is produced and shown on the display panel 37.

The user operates the operational portion 38, confirming the index picture shown on the display panel 37, to seek the desired frame. Successively, the user designates the print frame. When the representative frame is selected from the main-index picture 46, it is started to transfer the thumbnail-image data of the frames of the selected group, and the sub-index picture 48 of the selected group is produced. After that, the picture of the display panel 37 is changed from the main-index picture 46 to the sub-index picture 48.

When the frames are recorded in the grouping format, the main-index picture 46 is displayed separately from the sub-index picture 48 to be produced every group. Thus, in comparison with the case in that all the frames are displayed on the sole index picture, classification of the images may be intuitively grasped even if a picture size of the display panel 37 is small. Moreover, in comparison with the case in that all the frames are displayed on the sole index picture, an amount of the picture scroll is reduced when searching the frame. Therefore, an operation for searching the frame is easily performed even if the operational portion 38 is simple. Such advantages become greater as the number of the frames included in the memory card 16 increases.

Upon depressing the print button 41 after completing the designation of the print frame, the printing process is started. At this time, the main-image data of the designated print frame is transferred. The printer 31 executes the printing process on the basis of the transferred main-image data.

Figure 7:
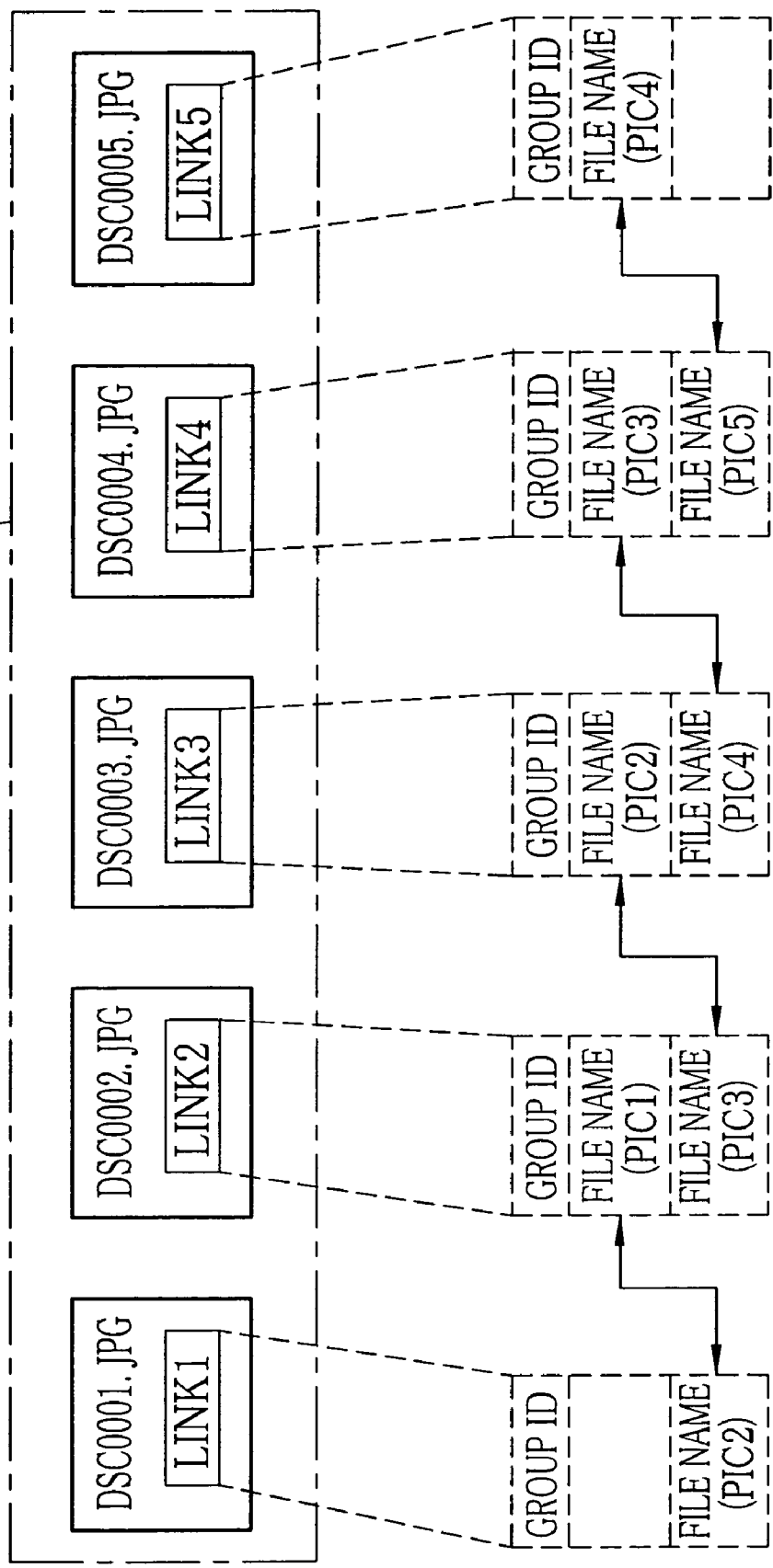
FIG. 7 is an explanatory illustration showing a second example of the grouping format.
Figure 8:
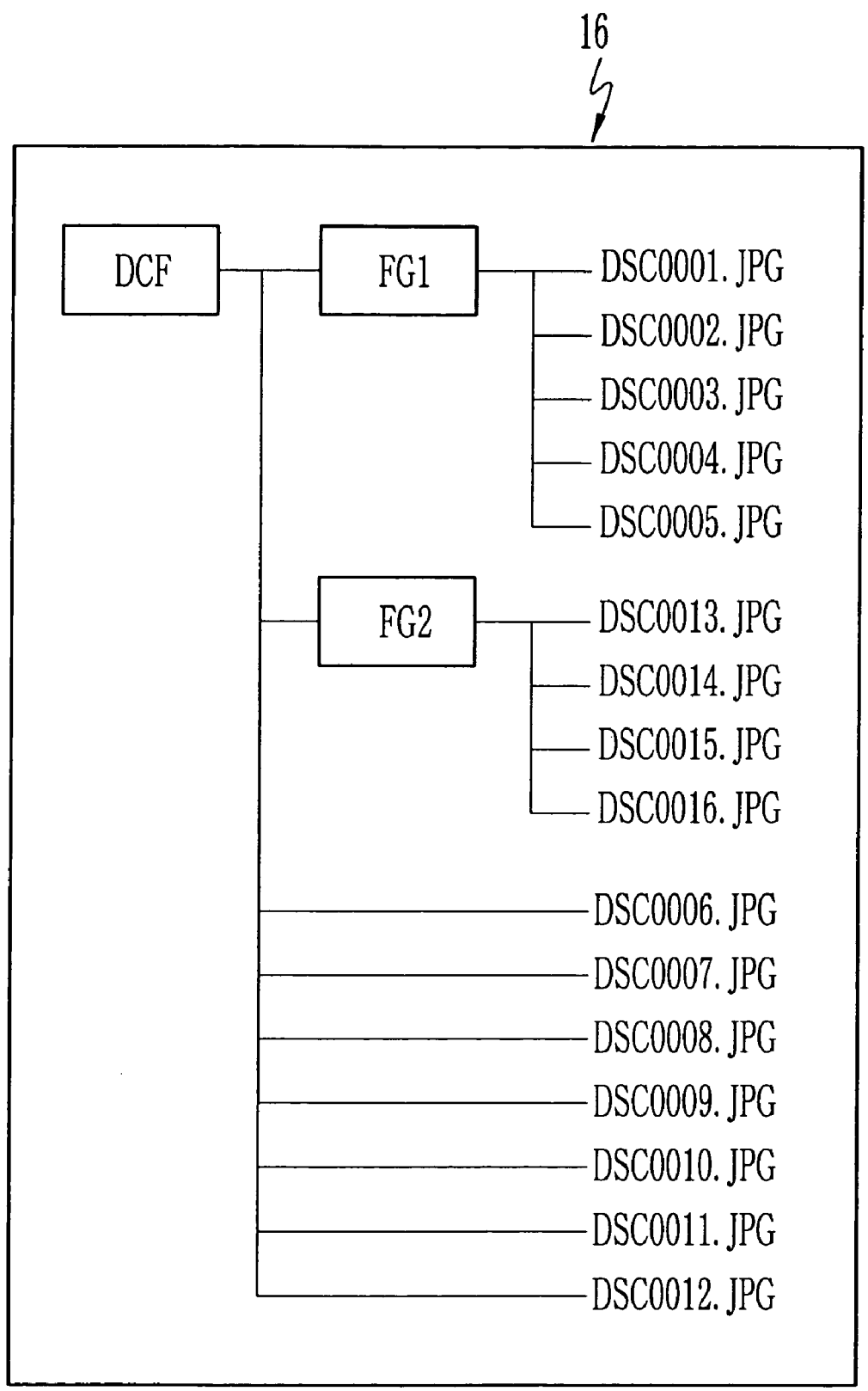
FIG. 8 is an explanatory illustration showing a third example of the grouping format.

In the above embodiment, the grouping format using the grouping information file is described as an example. Besides this, however, various formats may be considered. FIGS. 7 and 8 show examples of the grouping format. As to the grouping format shown in FIG. 7, link information is stored in the respective files of the grouped images. The link information is stored in the MakerNote area of the ExifTag, for example. The link information is used for connecting the frames, which belong to one image group, in a daisy-chain manner. The link information includes a group ID and image-file names of the frames photographed before and after the image concerned.

For instance, the link information LINK3 is stored in the image file (DSC0003.JPG) of frame No.3 of the image group G1. The link information LINK3 includes a group ID, a file name of the image file (DSC0002.JPG) of the frame No.2, and a file name of the image file (DSC0004.JPG) of the frame No.4. The frame No.2 is photographed just before the image file (DSC0003.JPG) of the frame No.3. The frame No.4 is photographed just after the image file (DSC0003.JPG) of the frame No.3. On the basis of existence of the link information, it is distinguished whether the frames are grouped or not. Further, when the link information exists, the group construction is recognized by following the grouped frames one after another on the basis of the link information.

In this kind of the grouping format, the link information is stored in the MakerNote area so that the file form of the Exif standard is maintained. Moreover, the image file is stored in a folder produced according to the DCF standard so that a basic storage form of the DCF standard is also maintained. Thus, a problem of compatibility is not caused relative to the other digital camera which is not adapted to the grouping format.

With respect to the grouping format shown in FIG. 8, sub-folders FG1 and FG2 are produced for each group under the DCF folder. The frame images are grouped in accordance with the sub-folders FG1 and FG2. The grouping format is distinguished on the basis of existence of the sub-folder. As the other example of the grouping format, is considered a method in which additional information included in the image file is used as a grouping key to group the frames. For example, when a photographic date is included as the additional information, grouping is performed on the basis of the photographic date. In such a case, setting information is necessary for representing that any of the additional information is set as the grouping key. The grouping format is distinguished on the basis of existence of the setting information.

In the grouping format shown in FIG. 8, the sub-folder is produced under the DCF folder. Due to this, there is a fear that the image file cannot be read out by the digital camera, which is not adapted to the sub-folder. However, in the grouping format utilizing the grouping key, the basic storage form of the DCF standard is maintained similarly to the grouping formats shown in FIGS. 2 and 7 so that the above fear is not caused.

In the forgoing embodiment, the inkjet system is adopted as the printing system of the printer. However, it is possible to use a printer adopting the other system of a thermal printing system and so forth.

A print-order receiving apparatus 81 shown in FIGS. 9 and 10 receives a print order such that the image data (reception image data) of the designated print frame is transferred from the memory card 16, which is brought by a customer, to a receiving storage device 82. The print-order receiving apparatus 81 has a function for distinguishing the grouping format, similarly to the printer 31, to display an index on the display panel 37 in accordance therewith. Incidentally, for the purpose of simplifying the description, members and portions identical to those of the printer 31 are denoted by the same reference numerals.

A system controller 83 controls each section of the print-order receiving apparatus 81 in accordance with operation signals outputted from an operational portion 84. The ROM 51 stores a program for controlling the apparatus 81. Although the operational portion 84 is similar to that of the printer 31, a reception button 86 is provided instead of the print button. The system controller 83 produces an index picture on the basis of the thumbnail-image data transferred from the card reader 58. The system controller 83 distinguishes whether or not the frames of the memory card 16 are recorded in the grouping format, on the basis of the data read by the card reader 58. When the frames of the memory card 16 are grouped, the index picture merely including the representative frames of the grouped frames is displayed. Upon selecting the representative frame, the picture is changed to the sub-index picture.

An operator or a customer operates the operational portion 84, confirming the index pictures, to designate the print frame. When the frames are recorded in the grouping format, the main-index picture is displayed first. After that, the representative frame is selected to change to the sub-index picture. In this way, the operations for searching the desired frame and for designating the print frame are easily performed even if there are a large number of the frames.

By pressing the reception button 86, the main-image data of the designated print frame is transferred to the receiving storage device 82. After completing the transfer, the print-order receiving apparatus 81 outputs a receipt 92 from a receipt discharge port 91. A first communication interface 93 is used for transferring the image data from the connected digital camera. A second communication interface 94 is used for transferring the image data to the receiving storage device 82. The print-order receiving apparatus 81 is connected to the receiving storage device 82 via LAN and the Internet, for example. The data transferred to the receiving storage device 82 is forwarded to a business printer of a minilab and so forth to carry out a printing process. It is needless to say that the received image data may be directly forwarded to the printer without passing through the receiving storage device 82.

Meanwhile, besides the above memory card, it is possible to use various recording media of CD (Compact Disk), DVD (Digital Versatile Disk), MO (Magnetic Optical) media and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A printer comprising:
   image-data taking means for taking in image data of frames from a recording medium;
   distinction means for distinguishing whether or not said frames are recorded in said recording medium in a grouping format, which is for grouping said frames, when taking in said image data;
   index-picture producing means for producing an index picture in which grouped frames and non-grouped individual frames are arranged and a single representative frame is respectively chosen for each group of the grouped frames;
   sub-index-picture producing means for producing a sub-index picture in which the frames of the same group are arranged;
   a display for displaying said index picture and said sub-index picture;
   changing means for changing an indication of the display from said index picture to said sub-index picture when one of said representative frames has been selected from said index picture shown on said display;
   print-frame designating means for designating the frame to be printed from one of said index picture and said sub-index picture; and
   printing means for printing the frame, which is designated by said print-frame designating means, on a recording paper.

2. A printer according to claim 1, wherein said representative frame is shown on said display in a distinguishable manner against the non-grouped individual frame.

3. A printer according to claim 2, wherein said representative frame is accompanied by a distinctive indicia.

4. A printer according to claim 2, wherein producing said sub-index picture is started when said representative frame has been selected.

5. A printer according to claim 4, wherein all the frames of the group to which the designated representative frame belongs are printed when the representative frame to be printed is designated by said print-frame designating means.

6. A printer according to claim 1, wherein the respective frames belonging to said group have group information for distinguishing the group.

7. A printer according to claim 6, wherein said index picture includes at least one representative frame and said individual frame when a number of said groups is small.

8. The printer according to claim 1, wherein each grouped frame comprises link information identifying at least one other frame in the same group.

9. A print receiving apparatus for receiving a print order of a desired frame from a plurality of frames recorded in a recording medium, comprising:
   image-data taking means for taking in image data of said frames from said recording medium;
   distinction means for distinguishing whether or not said frames are recorded in said recording medium in a grouping format, which is for grouping said frames, when taking in said image data;
   index-picture producing means for producing an index picture in which grouped frames and non-grouped individual frames are arranged and a single representative frame is chosen for each group of the grouped frames;
   sub-index-picture producing means for producing a sub-index picture in which the frames of the same group are arranged;
   a display for displaying said index picture and said sub-index picture;
   changing means for changing an indication of said display from said index picture to said sub-index picture when said representative frame has been selected from said index picture shown on said display; and
   frame designating means for designating the frame to be print-ordered from one of said index picture and said sub-index picture.

10. A print receiving apparatus according to claim 9, wherein said representative frame is shown on said display in a distinguishable manner against the non-grouped individual frame.

11. A print receiving apparatus according to claim 10, wherein said representative frame is accompanied by a distinctive indicia.

12. A print receiving apparatus according to claim 10, wherein producing said sub-index picture is started when said representative frame has been selected.

13. A print receiving apparatus according to claim 10, wherein all the frames of the group to which the designated representative frame belongs are print-ordered when the representative frame to be printed is designated by said frame designating means.

14. A print receiving apparatus according to claim 13, wherein the respective frames belonging to said group have group information for distinguishing the group.

15. The print receiving apparatus according to claim 9, wherein each grouped frame comprises link information identifying at least one other frame in the same group.

16. An index-picture displaying method comprising:
    taking in image data of frames from a recording medium;
    distinguishing whether or not said frames are recorded in said recording medium in a grouping format, which is for grouping said frames, when taking in said image data;
    displaying an index picture, in which grouped frames and non-grouped individual frames are arranged, on a display, a single representative frame being chosen for each group of the grouped frames in said index picture; and
    displaying a sub-index picture on said display instead of said index picture when one of said representative frames has been selected from said index picture, the frames of the same group being arranged within said sub-index picture.

17. A displaying method according to claim 16, wherein said representative frame is shown on said display in a distinguishable manner against the non-grouped individual frame.

18. A displaying method according to claim 17, wherein said index picture includes at least one representative frame and said individual frame when a number of said groups is small.

* * * * *